(12) United States Patent
Grieser-Schmitz et al.

(10) Patent No.: US 11,292,446 B2
(45) Date of Patent: Apr. 5, 2022

(54) TECHNIQUE FOR REDUNDANT REGISTRATION OF AN ACTUATION OF A MOTOR-VEHICLE BRAKING SYSTEM

(71) Applicant: Lucas Automotive GmbH, Koblenz (DE)

(72) Inventors: Stefan Grieser-Schmitz, Koblenz (DE); Michael Keller, Traisen (DE); Kenneth Vincent, Alcester (GB)

(73) Assignee: ZF Active Safety GmbH, Koblenz (DE)

( * ) Notice: Subject to any disclaimer, the term of this patent is extended or adjusted under 35 U.S.C. 154(b) by 0 days.

(21) Appl. No.: 16/654,823

(22) Filed: Oct. 16, 2019

(65) Prior Publication Data
US 2020/0039493 A1 Feb. 6, 2020

Related U.S. Application Data

(63) Continuation of application No. 14/009,615, filed as application No. PCT/EP2012/000897 on Mar. 1, 2012, now abandoned.

(30) Foreign Application Priority Data

Apr. 5, 2011 (DE) ...................... 10 2011 016 125.2

(51) Int. Cl.
*B60T 17/22* (2006.01)
*B60T 7/04* (2006.01)
(Continued)

(52) U.S. Cl.
CPC .............. *B60T 17/22* (2013.01); *B60T 7/042* (2013.01); *B60T 8/3255* (2013.01); *B60T 8/885* (2013.01);
(Continued)

(58) Field of Classification Search
CPC ........ B60T 17/22; B60T 13/662; B60T 7/042; B60T 2220/04; B60T 2270/402; B60T 8/885; B60T 8/3255; B60T 2270/413
See application file for complete search history.

(56) References Cited

U.S. PATENT DOCUMENTS 5,654,888 A * 8/1997 Muller .................... B60T 8/885
701/54
5,951,116 A 9/1999 Nagasaka et al.
(Continued)

FOREIGN PATENT DOCUMENTS

CN 1997540 A 7/2007
DE 19510525 A1 9/1996
(Continued)

OTHER PUBLICATIONS

PCT International Search Report, Application No. PCT/EP2012/000897, dated Jun. 1, 2012.
(Continued)

*Primary Examiner* — Jean Paul Cass
(74) *Attorney, Agent, or Firm* — Kristin L. Murphy

(57) ABSTRACT

A technique is described for the redundant registering of an actuation of a motor-vehicle brake system. A device which is provided for this purpose comprises a first sensor for generating a first sensor signal which indicates a movement of a mechanical input component of the brake system, and a second sensor for generating a second sensor signal which indicates a hydraulic pressure in the brake system. A processing device which is coupled to the two sensors is configured for selectively outputting an actuation signal which is generated on the basis of the first sensor signal or an actuation signal which is generated on the basis of the second sensor signal. The actuation signal indicates an actuation of the brake system.

11 Claims, 2 Drawing Sheets

(51) Int. Cl.
*B60T 8/88* (2006.01)
*B60T 8/32* (2006.01)
*B60T 13/66* (2006.01)

(52) U.S. Cl.
CPC ......... *B60T 13/662* (2013.01); *B60T 2220/04* (2013.01); *B60T 2270/402* (2013.01); *B60T 2270/413* (2013.01)

(56) References Cited

U.S. PATENT DOCUMENTS

| | | | |
|---|---|---|---|
| 5,954,407 A | 9/1999 | Schramm et al. | |
| 6,009,366 A * | 12/1999 | Burkhard | B60T 8/1764 180/197 |
| 6,102,492 A * | 8/2000 | Diehle | B60T 8/885 303/113.5 |
| 6,203,122 B1 * | 3/2001 | Ehmer | B60T 8/1766 188/369 |
| 6,256,570 B1 * | 7/2001 | Weiberle | B60T 7/042 188/170 |
| 6,460,941 B1 * | 10/2002 | Zenzen | B60T 8/1764 303/122 |
| 6,474,149 B1 * | 11/2002 | Ehmer | B60T 8/885 73/121 |
| 6,507,198 B1 * | 1/2003 | Streib | B60T 8/885 123/396 |
| 6,816,810 B2 * | 11/2004 | Henry | G01K 15/00 374/E15.001 |
| 6,928,356 B2 * | 8/2005 | Inoue | B60T 8/17636 303/173 |
| 7,047,121 B2 * | 5/2006 | Inoue | B60T 8/17636 303/173 |
| 7,278,694 B2 * | 10/2007 | Choi | B60T 8/17616 303/156 |
| 7,328,092 B2 * | 2/2008 | Eggert | B60T 17/22 701/31.7 |
| 7,467,035 B2 | 12/2008 | Sayce-Jones | |
| 8,075,067 B2 | 12/2011 | von Albrichsfeld et al. | |
| 8,154,227 B1 * | 4/2012 | Young | A63H 30/04 318/255 |
| 2001/0027537 A1 * | 10/2001 | Nada | B60K 6/445 714/23 |
| 2003/0199362 A1 * | 10/2003 | Chamberlin | A63B 22/0056 482/1 |
| 2004/0020201 A1 * | 2/2004 | Feigel | B60T 7/042 60/534 |
| 2005/0273231 A1 * | 12/2005 | Sayce-Jones | B60T 8/1708 701/31.4 |
| 2006/0206241 A1 * | 9/2006 | Minowa | F02D 41/263 701/1 |
| 2010/0033064 A1 * | 2/2010 | Tanaka | G01P 3/48 310/67 R |
| 2012/0298645 A1 * | 11/2012 | Kleespiess | H01R 43/048 219/137 R |
| 2013/0076281 A1 * | 3/2013 | Noguchi | H02P 6/10 318/400.04 |

FOREIGN PATENT DOCUMENTS

| | | |
|---|---|---|
| DE | 19640107 A1 | 4/1998 |
| DE | 19805089 A1 | 8/1998 |
| DE | 19907338 A1 | 5/2000 |
| DE | 102007035326 A1 | 1/2009 |
| EP | 0768224 A1 | 10/1995 |
| EP | 0937614 A2 | 8/1999 |
| WO | 0024618 A1 | 5/2000 |
| WO | 2005032896 A2 | 4/2005 |

OTHER PUBLICATIONS

Chinese First Office Action, Application No. CN201280026949.8, dated Jul. 2, 2015.

* cited by examiner

TECHNIQUE FOR REDUNDANT REGISTRATION OF AN ACTUATION OF A MOTOR-VEHICLE BRAKING SYSTEM

CROSS-REFERENCE TO RELATED APPLICATIONS

This application is a continuation of U.S. application Ser. No. 14/009,615, filed Jan. 15, 2014, which is a national stage entry of International Application No. PCT/EP2012/000897, filed Mar. 1, 2012, which claims priority to German Patent Application No. DE 10 2011 016 125.2, filed Apr. 5, 2011, the disclosures of which are incorporated herein by reference in their entirety.

BACKGROUND OF THE INVENTION

The present disclosure relates generally to the field of motor-vehicle braking systems. More precisely, the subject is the improvement of safety aspects in connection with the registering of an actuation of such a braking system.

Modern motor-vehicle braking systems are equipped with a plurality of sensors. From EP 0 768 224 A1, for example, a braking system is known that includes an actuating device fitted with several sensors. The sensors that have been provided in this case register different physical parameters within the scope of a braking operation. Accordingly, a pressure sensor serves for registering a hydraulic pressure in the master cylinder, a force sensor measures an actuating force on the brake pedal, and a pedal-travel sensor ascertains the distance traveled by the brake pedal. Other sensors, such as brake-light switches or pedal-angle sensors, also conventionally find application in braking systems.

For a number of driving-safety mechanisms and ride-comfort systems, but also for other purposes such as the control of regenerative braking in hybrid vehicles, the registering of a braking operation is of central importance. For this purpose—that is to say, for registering an actuation of the braking system—various of the named sensors may come into operation. For example, by means of the pedal-travel sensor a movement of the brake pedal can be registered, and in this way an actuation of the braking system can be inferred. The detected actuation is then signalled, in the form of an actuation signal which is generated by an evaluating unit situated downstream of the pedal-travel sensor, to subsequent systems and mechanisms.

By reason of the significance of the actuation signal, problems are to be expected if the pedal-travel sensor fails. The same applies in the event of a failure of the evaluating unit situated downstream of the pedal-travel sensor.

There is therefore a need for a reliable registration of the actuation of a motor-vehicle braking system.

BRIEF SUMMARY OF THE INVENTION

According to one aspect, an apparatus is proposed for redundant registering of an actuation of a motor-vehicle braking system. The apparatus includes at least one first sensor for generating a first sensor signal, the first sensor signal indicating a movement of a mechanical input component of the braking system, at least one second sensor for registering a second sensor signal, the second sensor signal indicating a hydraulic pressure in the braking system, and also a processing device coupled with the at least one first sensor and with the at least one second sensor, which is designed to selectively output an actuation signal generated on the basis of the first sensor signal or an actuation signal generated on the basis of the second sensor signal, the actuation signal indicating an actuation of the braking system.

The actuation signal can be signalled to subsequent driving-safety mechanisms, ride-comfort systems or other devices. The actuation signal may be an analogue or digital (e.g., binary) signal. Furthermore, the actuation signal can be generated or output continuously (i.e., even in the absence of an actuation of the braking system) or only intermittently (in the actuated state of the braking system).

The processing device may be designed to make a selection with regard to the actuation signal to be output as a function of an operational capability of individual components of the processing device itself. The processing device may therefore exhibit an internal mechanism for checking its operational capability.

According to a variant, the processing device is designed, for example, to output the actuation signal generated on the basis of the first sensor signal in the case of normal operational capability of the apparatus. Additionally or alternatively to this, the processing device may be designed to output the actuation signal generated on the basis of the second sensor signal in the case of irregular operational capability of the apparatus.

The checking of the operational capability may include a plausibility check. According to one realisation, the processing device is designed to draw upon the second sensor signal (or a signal derived therefrom) for the purpose of checking the plausibility of the first sensor signal. In the case of negative plausibility of the first sensor signal, an irregular operational capability of the apparatus can be inferred. On the other hand, in the case of a positive plausibility check a normal operational capability can be assumed. Similarly, the first sensor signal or a signal derived therefrom can be used for the purpose of checking the plausibility of the second sensor signal in connection with an actuation of the brake.

The processing device may exhibit one or more internal components. Accordingly, a first evaluating unit coupled with at least the first sensor (and optionally also with the second sensor) may be provided which is designed for evaluating the first sensor signal (and optionally the second sensor signal). The first evaluating unit may furthermore be designed for generating the actuation signal on the basis of the (evaluated) first and/or second sensor signal. Additionally or alternatively to this, a second evaluating unit coupled with at least the second sensor (and optionally also with the first sensor) may be provided. The second evaluating unit may be different from the first evaluating unit and may be arranged parallel to the latter in the direction of signal propagation. The second evaluating unit is designed for evaluating the second (and optionally the first) sensor signal and for generating the actuation signal on the basis of the second (and/or the first) sensor signal.

The processing device may further include a checking unit coupled with the first evaluating unit and/or with the second evaluating unit. In one implementation, the checking unit is designed for checking the functional capability of the first and/or second evaluating unit. In the case of irregular operational capability of the first evaluating unit, the actuation signal generated on the basis of the second sensor signal, and conversely, can be output.

In the case of two evaluating units arranged parallel to one another, the processing device may further include a multiplexer coupled with output sides of the two evaluating units. The multiplexer may be capable of being driven by the checking unit as a function of the operational capability of the first (and/or the second) evaluating unit, in order to output optionally the actuation signal generated on the basis of the first sensor signal or the actuation signal generated on the basis of the second sensor signal.

The second evaluating unit may include a comparator. The comparator is preferentially designed to compare the second sensor signal with a reference signal and to generate the actuation signal as a function of the comparison. Provided that the second sensor signal is likewise supplied to the first evaluating unit, the first evaluating unit may likewise include a comparator of such a type. A comparator based on a reference signal may also be used by the first or second evaluating unit for the purpose of generating the actuation signal on the basis of the first sensor signal.

The sensors may be designed for registering extremely varied physical parameters. According to an exemplary realisation, the first sensor is designed for registering a braking request of a driver—that is to say, for example, an actuation of the brake pedal. The actuation of the brake pedal can be detected by a pedal-travel sensor, a pedal-angle sensor, a pedal-force sensor or a brake-light switch. Two or more of these sensors may be also provided in redundant manner.

The second sensor may be a hydraulic-pressure sensor. The hydraulic-pressure sensor may be arranged, for example, in the region of the master cylinder for the purpose of registering the hydraulic pressure prevailing there. In an exemplary implementation, the hydraulic-pressure sensor has been assigned to a wheel-slip control system.

According to a further aspect, a method is proposed for redundant registering of an actuation of a motor-vehicle braking system. The method comprises the steps of providing at least one first sensor for generating a first sensor signal which indicates a movement of a mechanical input component of the braking system, of providing at least one second sensor for generating a second sensor signal which indicates a hydraulic pressure in the braking system, and also of selectively outputting an actuation signal generated on the basis of the first sensor signal, or an actuation signal generated on the basis of the second sensor signal, which indicates an actuation of the braking system.

In the case of a normal operational capability of an extended braking system including the braking system, the actuation signal generated on the basis of the first sensor signal can be output. On the other hand, in the case of an irregular operational capability of the extended braking system, the actuation signal generated on the basis of the second sensor signal can be output. The extended braking system may comprise, in addition to the braking system (which, for example, includes wheel brakes, a wheel-slip control system, etc.), also the apparatus presented here for redundant registering of an actuation of the braking system.

The second sensor signal or a signal derived therefrom can be drawn upon for checking the plausibility of the first sensor signal. Conversely, the second sensor signal can be subjected to a plausibility check on the basis of the first sensor signal or a signal derived therefrom. In the case of a negative plausibility of the first sensor signal, an irregular operational capability of the apparatus (at any rate, with regard to the signal path provided for the first sensor signal) can be inferred, and conversely.

A first evaluating unit coupled with at least the first sensor can evaluate the first sensor signal and generate the actuation signal on the basis of the first sensor signal. Alternatively or additionally to this, a second evaluating unit coupled with at least the second sensor can evaluate the second sensor signal and generate the actuation signal on the basis of the second sensor signal. In the case of irregular operational capability of the first evaluating unit, the actuation signal generated on the basis of the second sensor signal can be output, and conversely.

Also provided is a computer-program product with program-code means for implementing the steps of the process presented here when the computer-program product is executed on a computer device. The computer device may be an electronic control unit (ECU). The computer-program product may be stored on a computer-readable recording medium.

Other advantages of this invention will become apparent to those skilled in the art from the following detailed description of the preferred embodiment, when read in light of the accompanying drawings.

DETAILED DESCRIPTION OF THE INVENTION

Figure 1:
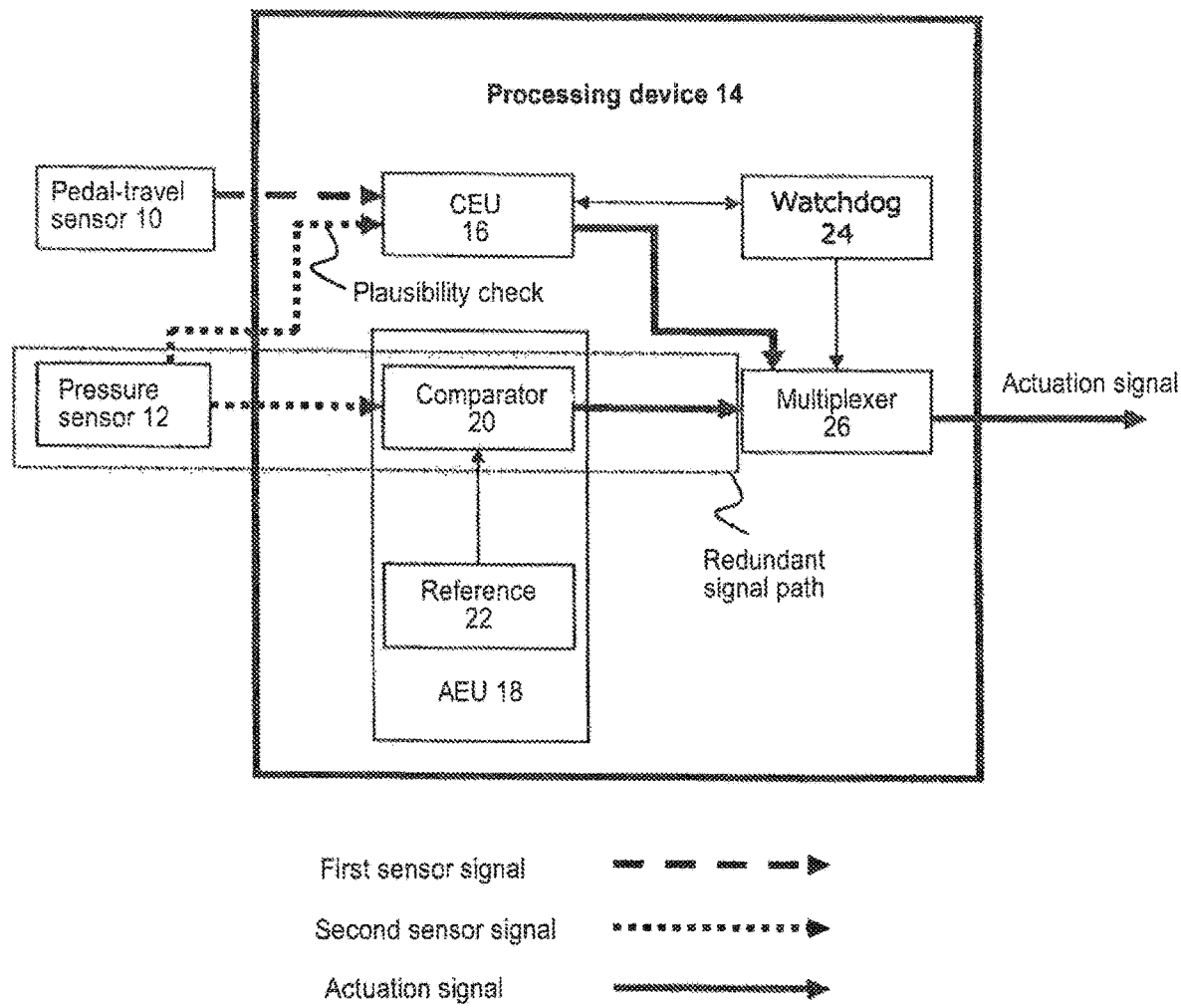
FIG. 1 is an embodiment of an apparatus for redundant registering of an actuation of a motor-vehicle braking system.

FIG. 1 shows an embodiment of an apparatus for redundant registering of an actuation of a motor-vehicle braking system. The apparatus permits the registering of an actuation of the brake even in the case of a sensor defect or a malfunction in the evaluating chain downstream of the sensor.

As represented in FIG. 1, the apparatus includes as central components at least two sensors 10, 12 for redundant registering of an actuation of the braking system, and also a processing device 14 coupled with the sensors 10, 12. The processing device 14 receives on the input side two or more sensor signals and supplies on the output side an actuation signal which indicates an actuation of the braking system. The actuation signal is supplied to mechanisms and systems situated downstream of the processing device 14. In exemplary manner, mention may be made here of the detection of a braking request of the driver, for instance in an electrically controlled braking system ("brake by wire") or in a braking system that has been provided for a hybrid vehicle with regenerative braking function.

The first sensor 10 is generally a sensor that registers a movement of a mechanical input component of the braking system. The input component may be, for example, a brake pedal, a brake booster or a master cylinder. In the embodiment according to FIG. 1 the first sensor takes the form of a pedal-travel sensor 10. It will be understood that, instead of the pedal-travel sensor 10 or in addition to the pedal-travel sensor 10, further sensors may have been provided that are suitable to register a movement of a mechanical input component of the braking system.

In addition to the pedal-travel sensor 10, a second sensor has been provided which in the embodiment according to FIG. 1 takes the form of a pressure sensor 12. The pressure sensor 12 registers a hydraulic pressure in the braking system in connection with the registering of an actuation of the same. The pressure sensor 12 may, for example, have been arranged in the region of a master cylinder of the braking system, in order to register the master-cylinder pressure. However, the pressure sensor 12 could also have been arranged at another place (such as on the wheel brakes or in the hydraulic power pack of a wheel-slip control system). It will be understood that, instead of a single pressure sensor 12, several such pressure sensors may have been provided and may have been coupled with the processing device 14.

According to one realisation, the pressure sensor 12 has been provided exclusively for (redundant) registering of an actuation of the braking system. For cost reasons, however, it is advantageous if a pressure sensor 12 which has been integrated within the braking system in any case (e.g., the pressure sensor of a wheel-slip control system) is used additionally for the purpose of registering an actuation of the braking system.

As represented in FIG. 1, the processing device 14 includes a plurality of internal components. The components may be logically or physically separate components (e.g., separate electrical or electronic circuits).

The centrepiece of the processing unit 14 is a central evaluating unit 16 which may be realised from a host computer (in e.g. an ECU). As illustrated in FIG. 1, both an output signal of the pedal-travel sensor 10 and an output signal of the pressure sensor 12 are supplied to the central evaluating unit 16. The output signal of the pedal-travel sensor 10 is an analogue electrical signal which indicates an actuation travel of the brake pedal. In similar manner, the output signal of the pressure sensor 12 is an analogue electrical signal which indicates a hydraulic pressure prevailing in the braking system.

The central evaluating unit 16 is designed to compare the output signal of the pedal-travel sensor 10 with a reference value and, on the basis of this comparison, to set a signal level for an actuation signal provided on the output side by the central evaluating unit 16. An exceeding or undershooting of the reference value therefore becomes perceptible in a change of level of the (binary) actuation signal. An actuation of the braking system is detected by the central evaluating unit 16 whenever the output signal of the pedal-travel sensor 10 indicates that a pedal travel above the reference value has been traveled. The central evaluating unit 16 is furthermore designed to check the plausibility of the output signal of the pedal-travel sensor 10 on the basis of the output signal of the pressure sensor 12.

Parallel to the central evaluating unit 16, in the processing device 14 an ancillary evaluating unit 18 has been provided (e.g., as a separate electrical or electronic circuit). In the embodiment according to FIG. 1 the ancillary evaluating unit 18 receives only the output signal of the pressure sensor 12. The output signal of the pressure sensor 12 is therefore supplied in parallel to the central evaluating unit 16 and to the ancillary evaluating unit 18.

The ancillary evaluating unit 18 includes a comparator 20 and also a reference-value generator 22. The comparator 20 is designed to compare the output signal of the pressure sensor 12 with an optionally adjustable reference value provided by the reference-value generator 22. An exceeding or undershooting of the reference value brings about a change of level of an output signal of the comparator 20. The ancillary evaluating unit 18 generates in this way a binary actuation signal (in the form of the output signal of the comparator 20) which indicates an actuation of the braking system. An actuation is therefore detected whenever the hydraulic pressure registered by the pressure sensor 12 exceeds the reference value.

A checking unit 24 denoted in FIG. 1 as "watchdog" has been provided for checking the operational capability of the central evaluating unit 16. Depending on the result of this check, the checking unit 24 drives a multiplexer 26.

As shown in FIG. 1, the multiplexer 26 receives on the input side both the actuation signal generated by the central evaluating unit 16 and the actuation signal generated by the ancillary evaluating unit 18. In the case of normal operational capability of the central evaluating unit 16, the checking unit 24 drives the multiplexer 26 to the effect that the processing device 14 outputs the actuation signal generated by the central evaluating unit 16. In the case of irregular operational capability, by means of the checking unit 24 a switching of the multiplexer 26 occurs in such a manner that the processing unit 14 outputs the actuation signal generated by the ancillary evaluating unit 18.

The generation of the actuation signal is therefore based primarily on the output signal of the central evaluating unit 16 (and also on the output signal of the pedal-travel sensor 10). On the other hand, the redundancy provided by the pressure sensor and the ancillary evaluating unit 18 with regard to the actuation signal is made use of in the event of a fault.

Figure 2:
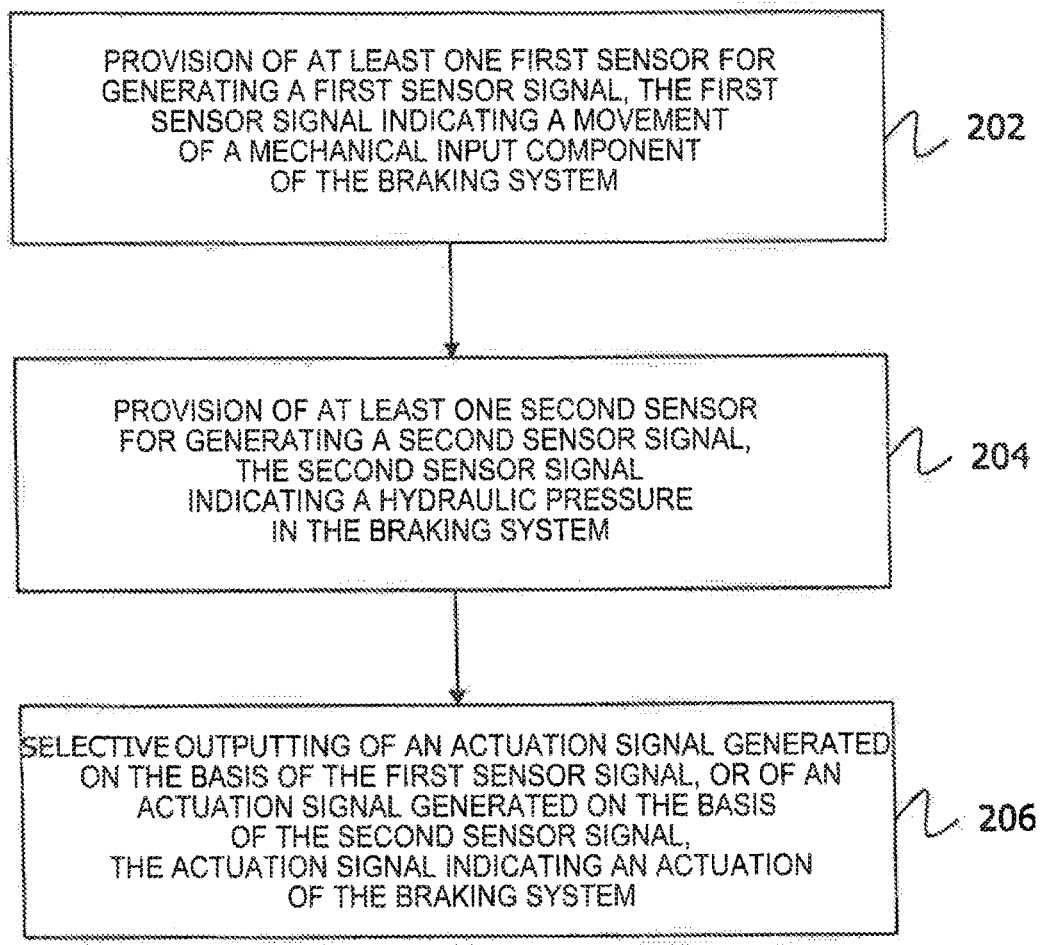
FIG. 2 is an embodiment of a method for operating the apparatus according to FIG. 1.

In the following, the mode of operation of the apparatus, represented in FIG. 1, for redundant registering of an actuation of the brake will be elucidated in greater detail with reference to the flow chart 200 according to FIG. 2. The flow chart 200 illustrates an embodiment of a method for redundant registering of an actuation of the brake on the basis of the apparatus represented in FIG. 1.

In two method steps 202 and 204 carried out in parallel with respect to one another, the pedal-travel sensor 10 and the pressure sensor 12 provide their output signals to the processing device 14. As already elucidated above, the output signal of the pedal-travel sensor 10 indicates a movement of the brake pedal. The output signal of the pressure sensor 12, on the other hand, indicates a rise in pressure in the hydraulic circuit of the braking system. Both events—i.e., an actuation of the brake pedal, on the one hand, and a rise in pressure in the hydraulic circuit, on the other hand—allow an actuation of the braking system to be inferred.

In a further method step 206 the processing device 14 outputs an actuation signal. More precisely, selectively an actuation signal generated on the basis of the output signal of the pedal-travel sensor 10 or an actuation signal generated on the basis of the output signal of the pressure sensor 12 is output by the processing unit 14. Various exemplary selection mechanisms which may be implemented in the processing device 14 in this connection will be elucidated in greater detail in the following.

In normal operation—that is to say, in the case of normal operational capability of the apparatus represented in FIG. 1—the actuation signal generated on the basis of an output signal of the pedal-travel sensor 10 is output by the processing device 14. For this purpose the central evaluating unit 16 evaluates the output signal of the pedal-travel sensor 10, as elucidated above, by comparison with a reference value, whereby an exceeding or undershooting of the reference value becomes perceptible through a change of level in the actuation signal generated by the central evaluating unit 16.

For the purpose of checking the plausibility of the output signal of the pedal-travel sensor 10 the central evaluating unit 16 additionally reads in the output signal of the pressure sensor 12 and likewise evaluates this output signal (as described above with reference to the ancillary evaluating unit 18). Provided that both output signals indicate an actuation of the braking system concordantly, a corresponding actuation signal is generated by the central evaluating unit 16.

If, on the other hand, a rise in hydraulic pressure in the master cylinder is detected by the central evaluating unit 16 without a corresponding change in the output signal of the pedal-travel sensor 10, a deficient operational capability of the pedal-travel sensor 10 can be inferred by the central evaluating unit 16. In this case, the central evaluating unit 16 generates the actuation signal indicating the actuation of the braking system on the basis of the output signal of the pressure sensor 12.

The operational capability of the central evaluating unit 16 is monitored by the checking unit 24. So long as the checking unit 24 detects a normal operational capability of the central evaluating unit 16, the checking unit 24 drives the multiplexer 26 in such a manner that the actuation signal generated by the central evaluating unit 16 is provided by the processing device 14 by way of output signal. If, on the other hand, the checking unit 24 detects an irregular function (e.g. a failure) of the central evaluating unit 16, the multiplexer 26 is driven in such a manner that the actuation signal generated by the ancillary evaluating unit 18 is output by the processing device 14. In this case, the redundant signal path illustrated in FIG. 1, which includes the pressure sensor 12 and also the ancillary evaluating unit 18, accordingly comes into effect.

Accordingly, it proves to be an advantage here that the output signal of the pressure sensor 12 is evaluated by the evaluating unit 18 (e.g., as a separate circuit), which is different from the central evaluating unit 16 (computer or ECU). The output signal of the pressure sensor 12 can therefore be used not only for checking the plausibility of the output signal of the pedal-travel sensor 10 but also as a fall-back solution in the case of deficient operational capability of the central evaluating unit 16.

Since the brake-pressure information in modern braking systems with wheel-slip-control functionality is available in any case, the method described herein for redundant registering of the actuation of the brake can be realised without additional sensorics. The approach presented here can be used both for plausibility-checking purposes and as a fall-back solution (with automatic switching in the event of a fault). In this connection the ancillary evaluating unit 18 may be realised advantageously as a separate evaluating circuit which is operated independently of a master computer (central evaluating unit 16).

In accordance with the provisions of the patent statutes, the principle and mode of operation of this invention have been explained and illustrated by its preferred embodiment. However, it must be understood that this invention may be practiced otherwise than as specifically explained and illustrated without departing from its spirit or scope.

What is claimed is:

1. An apparatus for registering of an actuation of a motor-vehicle braking system, comprising:
    a first sensor generating a first sensor signal, the first sensor signal indicating a movement of a mechanical input component of the braking system;
    a second sensor generating a second sensor signal, the second sensor signal indicating a hydraulic pressure in the braking system;
    a central evaluating unit coupled with the first sensor and the second sensor, the central evaluating unit configured to execute a program that generates a first actuation signal indicating an actuation of the braking system generated on the basis of the first sensor signal and the second sensor signal, wherein the program executed by the central evaluating unit further uses the second sensor signal for the purpose of checking a plausibility of the first sensor signal;
    a watchdog checking unit coupled with the central evaluating unit to check an operational capability of the central evaluating unit to execute the program;
    an auxiliary evaluating circuit separate from the central evaluating unit which receives the second sensor signal and is configured to output a second actuation signal on the basis of the second sensor signal; and
    a multiplexer receiving the first actuation signal and the second actuation signal, wherein the multiplexer is driven by the watchdog checking unit so that the multiplexer outputs the first actuation signal when the watchdog checking unit detects normal operational capability of the central evaluating unit and the multiplexer outputs the second actuation signal when the watchdog checking unit detects irregular operational capability of the central evaluating unit.

2. The apparatus of claim 1 wherein the auxiliary evaluating circuit is comprised of a comparator comparing the second sensor signal with a reference signal and generating the second actuation signal as a function of the comparison.

3. The apparatus of claim 1 wherein the first sensor is associated with a brake pedal for registering movement of the brake pedal.

4. The apparatus of claim 1 wherein the first sensor is comprised of a pedal-travel sensor, a pedal-angle sensor, a pedal-force sensor, or a brake-light switch.

5. The apparatus of claim 1 wherein the second sensor is associated with a wheel-slip control system.

6. A method for registering of an actuation of a motor-vehicle braking system, comprising the steps of:
    generating a first sensor signal with a first sensor indicating a movement of a mechanical input component of the braking system;
    generating a second sensor signal with a second sensor indicating a hydraulic pressure in the braking system;
    generating a first actuation signal from a central evaluating unit coupled with the first sensor and the second sensor, the central evaluating unit executing a program for selectively generating the first actuation signal on the basis of the first sensor signal and the second sensor signal and for checking a plausibility of the first sensor signal using the second sensor signal;
    checking an operational capability of the central evaluating unit to execute the program using a watchdog checking unit coupled with the central evaluating unit;
    generating a second actuation signal on the basis of the second sensor signal in an auxiliary evaluating circuit separate from the central evaluating unit; and
    selectively outputting one of the first actuation signal and the second actuation signal from a multiplexer driven by the watchdog checking unit, wherein the multiplexer outputs the first actuation signal when the watchdog checking unit detects normal operational capability of the central evaluating unit and the multiplexer outputs the second actuation signal when the watchdog checking unit detects irregular operational capability of the central evaluating unit.

7. The method of claim 6 wherein the auxiliary evaluating unit is comprised of a comparator for comparing the second sensor signal with a reference signal and generating the second actuation signal as a function of the comparison.

8. The method of claim 6 wherein the first sensor is associated with a brake pedal for registering movement of the brake pedal.

9. The method of claim 6 wherein the first sensor is comprised of a pedal-travel sensor, a pedal-angle sensor, a pedal-force sensor, or a brake-light switch.

10. The method of claim 6 wherein the second sensor is associated with a wheel-slip control system.

11. An apparatus for registering of an actuation of a motor-vehicle braking system, comprising:

- a first sensor generating a first sensor signal, the first sensor signal indicating a movement of a mechanical input component of the braking system, wherein the first sensor is comprised of a pedal-travel sensor, a pedal-angle sensor, a pedal-force sensor, or a brake-light switch;
- a second sensor generating a second sensor signal, the second sensor signal indicating a hydraulic pressure in the braking system, wherein the second sensor is associated with a wheel-slip control system;
- a central evaluating unit coupled with the first sensor and the second sensor, the central evaluating unit configured to execute a program that generates a first actuation signal indicating an actuation of the braking system generated on the basis of the first sensor signal and the second sensor signal, wherein the program executed by the central evaluating unit further uses the second sensor signal for the purpose of checking a plausibility of the first sensor signal;
- a watchdog checking unit coupled with the central evaluating unit to check an operational capability of the central evaluating unit to execute the program;
- an auxiliary evaluating circuit separate from the central evaluating unit which receives the second sensor signal and is configured to output a second actuation signal on the basis of the second sensor signal; and
- a multiplexer receiving the first actuation signal and the second actuation signal, wherein the multiplexer is driven by the watchdog checking unit so that the multiplexer outputs the first actuation signal when the watchdog checking unit detects normal operational capability of the central evaluating unit and the multiplexer outputs the second actuation signal when the watchdog checking unit detects irregular operational capability of the central evaluating unit.

* * * * *